United States Patent

[11] 3,608,673

| [72] | Inventor | Pietro Cucciati<br>Via Velasca 8, Milan, Italy |
|---|---|---|
| [21] | Appl. No. | 869,666 |
| [22] | Filed | Oct. 27, 1969 |
| [45] | Patented | Sept. 28, 1971 |
| [32] | Priority | May 14, 1969 |
| [33] | | Italy |
| [31] | | 16,879-A/69 |

[54] LUBRICATION DEVICE FOR UNBALANCED ROTATING MEMBERS, PARTICULARLY PERCUSSION TOOLS
6 Claims, 3 Drawing Figs.

[52] U.S. Cl. .................................................. 184/6.14,
173/49, 184/6.28
[51] Int. Cl. ...................................................... E02d 7/18,
F16n 1/00
[50] Field of Search .......................................... 184/6 X,
30, 6.14; 173/49; 81/52.3; 74/61, 87; 308/187

[56] References Cited
UNITED STATES PATENTS

| 2,728,614 | 12/1955 | Rink .............................. | 74/61 X |
| 2,858,175 | 10/1958 | Sutherland ................... | 184/1 X |
| 3,277,732 | 10/1966 | Wahl ............................ | 74/87 |
| 3,272,024 | 9/1966 | Wahl ............................ | 308/187 X |
| 3,321,043 | 5/1967 | Vaughn ........................ | 81/52.3 X |
| 3,522,740 | 8/1970 | Hynes et al. .................. | 74/87 |

*Primary Examiner*—Mandel A. Antonakas
*Attorney*—Woodhams, Blanchard and Flynn

ABSTRACT: A housing having an annular chamber defined at its radially inner side by an annular ring. Lubricant is conveyed into said chamber under the influence of dynamic action, through an opening in the ring, to lubricate bearings adjacent the ring and supporting the housing on a shaft extending through the ring. The opening in the ring communicates with a passageway in the shaft.

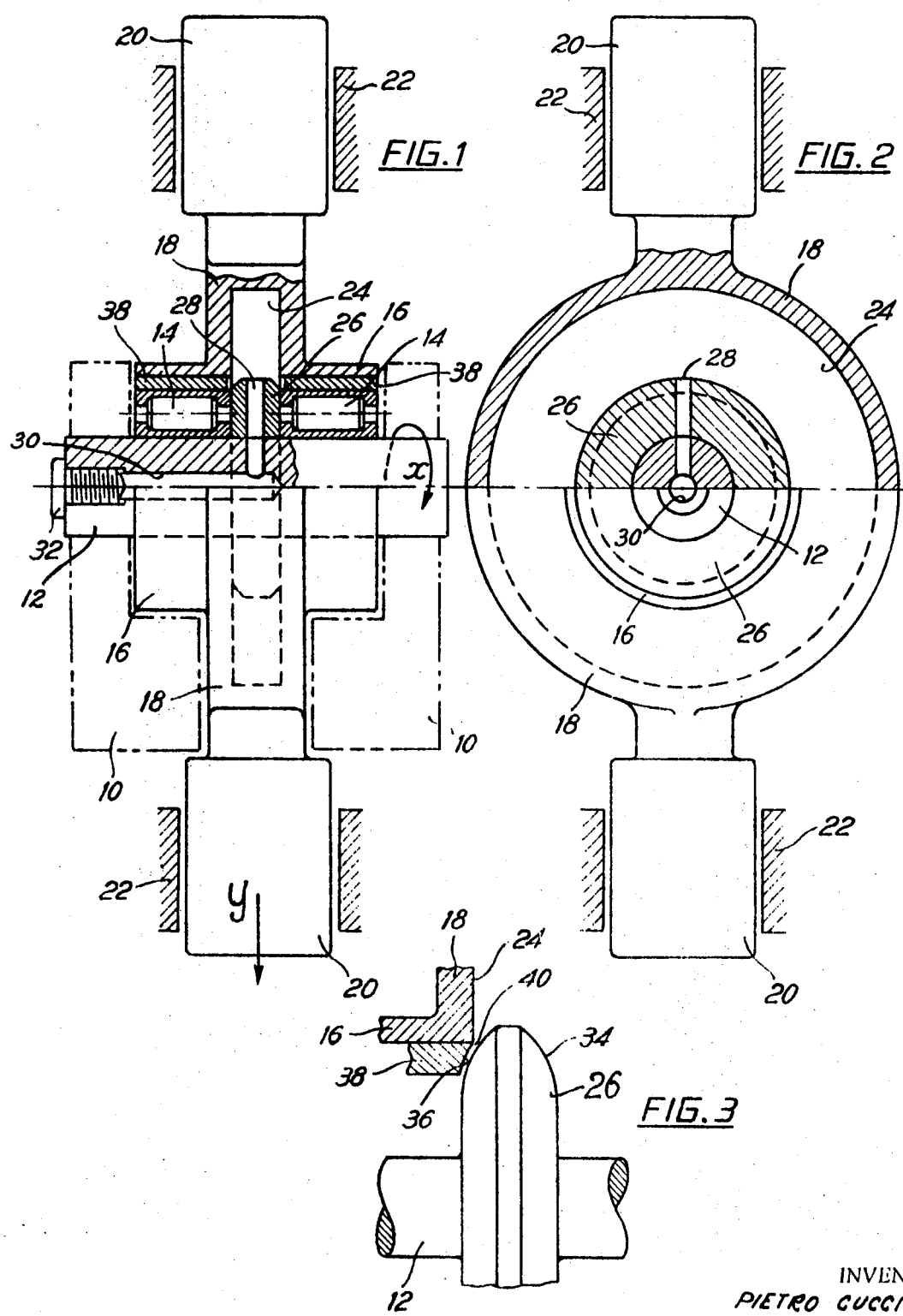

LUBRICATION DEVICE FOR UNBALANCED ROTATING MEMBERS, PARTICULARLY PERCUSSION TOOLS

The present invention relates generally to a lubrication device for rotating members provided with unbalanced weights, such as vibrating members or percussion tools of mechanical kind, where an eccentric weight, provided by a linkage, gives force impulses to the tool ram.

The lubrication of the percussion tools under consideration is in practice unsatisfactory and causes drawbacks impairing the performance and efficiency of these percussion tools. Indeed, lubrication of these percussion tools is unsatisfactory owing to the centrifugal action particularly the frequent acceleration and deceleration movements of the moving members.

As a matter of fact, under the alternating stresses acting on the tool ram the lubricant stock (grease and heavy oil) is forcibly pushed towards the rolling area of the surfaces to be lubricated with consequent swift ejection of such lubricant from the reservoir outwards. Moreover, the lubricating film between a pivot pin and associated bearing is easily squeezed and destroyed, causing drying up seizures and other drawbacks.

An object of the present invention is to eliminate these and other drawbacks by embodying an efficient and rational lubrication of members provided with eccentric weights and underlying therefore to frequent alternating stresses.

Another object of the present invention is to embody a lubrication device which, besides meeting the above-mentioned requirements, could be easily embodied and inserted into the machine member under consideration such as a crank mechanism.

The device according to the present invention, to be applied to unbalanced rotating members including a pivot pin and the associated support seat to act upon a reciprocating member, is characterized in that it comprises at least a lubricant collection chamber provided by the support seat of said reciprocating member and having at its end at least a slit, a part of whose walls are confined by the end of a member which is radially secured to the pivot pin of said reciprocating member, whereas its end opening is near or on at least a part of the sliding surfaces of the pivot pin and associated support in such a way that, owing to the dynamic action of the reciprocating weights, displacement of the lubricant as thrown under the centrifugal force towards said sliding surfaces is adjusted and controlled.

The inventive idea as now disclosed may undergo modifications and charges within present invention. F.i. the radial member can extend angularly more or less along the pivot pin peripheral surface till to 360° to form in such a way a rim, whose edge cooperates with an associated seat as provided in the least a part of lubricant chamber opening.

The invention will now be described in the following specification by way of example only, with reference to the accompanying drawing illustrating an advantageous embodiment of the device as applied to the ram of a percussion tool. FIG. 1 shows a partially sectioned front view of the percussion tool ram as provided according to the present invention.

FIG. 2 is a partially sectioned side view; and

FIG. 3 shows a detail of FIG. 1 on an enlarged scale.

The illustrated ram relates to a hammer drill and is under the control of a suitable and well-known linkage (not shown). This ram is constituted by eccentric weights 10 journaled about a pivot pin or shaft 12. The pivot pin 12 is supported through roller bearings 14 by a ring nut or hub 16 provided in its middle part with a flange 18, said flange 18 having diametrically opposed guide pins 20 held in associated bearings 22 which are secured to the frame of the percussion tool.

The ring nut 16 has according to the invention an annular chamber 24 coaxially arranged to the pivot pin 12 containing a lubricant stock.

The pivot pin 12 has a flange 26 derived therefrom or anyway fastened thereto, said flange having one or more radial holes 28 connecting to an axial hole 30 provided in pivot pin 12 and terminating with a threaded length to hold a closing screwplug 32. In such a way access from outside is ensured to the annual chamber, that can be filled with a suitable lubricant as herein below explained.

The flange 26 terminates at its periphery with shaped surfaces 34 (as shown in FIG. 3) directed in such a way as to converge towards the bottom wall of annual chamber 24. In the present embodiment as illustrated the surfaces 34 cooperate with associated annular surfaces 36 provided by the edges of rings 38 fitted in the ring nut 16 and forming the edges of an annular opening of chamber 24. The annular surfaces 34 and 36 form in such a way opposed annular slits or gaps 40, which are provided at the slide surfaces of bearings 14 and connecting to annular chamber 24.

Referring now to the percussion tool operation, the control motor of said percussion tool causes pivot pin 12 to carry out a continuous rotation in the direction of arrow $x$ and this rotation is transmitted to the eccentric weights 10, which, due to their dynamic forces, cause a reciprocating motion of oscillating system 18–20 in the direction of arrow $y$ of FIG. 1. Rotation of flange 26 causes a centrifugal motion of the lubricant contained in the annular chamber 24 and such a lubricant collects as a ring on the bottom of said annular chamber. The dynamic action of the eccentric weights causes, as already said, an axial sliding motion of the swinging system 18–20.

It is to be noted that due to the clearance between the stationary and rotating parts there is a periodical alteration of the passage section between the shaped surfaces 34, 36 and slit 40. This alteration of the passage section has a maximum and a minimum value, respectively, at the axes of the guide pins 20 in relation to the axial displacement of the swinging system 18–20. When swinging system 18–20 reverses its motion, that is when the motion of said system is in the direction opposite to arrow $y$, then the section of annular slit 40 increases at the device upper part and due to the impact action a portion of the lubricant contained in the upper part of annular chamber 24 is thrown against a part of the peripheral surface of flange 26. A part of this lubricant passes through the clearance between surfaces 34 and 36 and is converged into the rollers of roller bearings 14.

When eccentric weights 10 cause during their motion continuation a movement of swinging system 18–20 (that is when this system is caused to perform a motion opposite to arrow $y$), then the lubricant-remaining part (that is the part adhering to bottom wall of annular chamber 24 during the preceding motion step) is thrown against the part of the flange peripheral surface which was not previously involved and a restricted portion thereof passes through the annular slit 40 to cause lubrication of roller bearings 14 as above mentioned.

The lubricant portion remaining in the upper part of annular slit 40 during the preceding motion step is thrown against roller bearings 14 due to the reciprocal approaching of surfaces 34 and 36 belonging to said area by ensuring always in such a manner the lubrication of the rotating parts during the to-and-fro motion steps of the percussion device. Lubrication is always ensured inasmuch the dynamic action due to the oscillating weights overcomes that one depending on the centrifugal action of flange 26.

The lubrication device as hereinbefore described and illustrated might undergo some modifications and changes depending on work and other requirements as f.i. the physical features of the lubricants as used some time or other time.

Moreover, the inclination and/or the shape of annular surfaces 34, 36 as well as the distance of said surfaces from one another can be suitably altered. The same is for the height or depth of annular chamber 24, which can be altered in relation to the motion features of the lubrication device and particularly in relation to the diameter and therefore centrifugal action of flange 26. Further and as already said, the angular extension of flange 24 can be suitably altered in the sense that said flange provides at its periphery some areas, wherein the angles as formed by the surface 34 change to form annular slits 40, whose cross section changes along the slit periphery.

It is to be understood that the present invention covers also the percussion tool embodying the lubrication device according to the invention. These and other features are included in the invention as set fourth in the appended claims.

I claim:

1. A device for the automatic lubrication of bearing means rotatably supported upon a shaft having eccentric weights secured thereto and rotatable therewith, comprising:

housing means having a lubricant chamber with axial wall means, said housing means having a bearing chamber communicating with said lubricant chamber through said axial wall means and containing said bearing means;

lubricant in said lubricant chamber;

annular flange means secured to said shaft and rotatable therewith, said annular flange means having an axial surface adjacent said axial wall means to define a lubricant passageway therebetween; and means for supporting said housing means for reciprocating movement in a direction perpendicular to the axis of rotation of said shaft, said reciprocatory movement being in response to a rotation of said shaft and eccentric weights, said lubricant in said lubricant chamber being caused to come into engagement with said axial wall means and said flange in response to reciprocatory movements of said housing means, a portion of said lubricant entering said lubricant passageway and said bearings.

2. A device according to claim 1 wherein said lubricant chamber has an annular bottom wall; and wherein said lubricant passageway is inclined to the vertical.

3. A device according to claim 1 wherein said axial surface of said annular flange means is curved near the periphery thereof and the contour of said wall means conforms therewith.

4. A device according to claim 1 including passage means in said shaft and flange means for filling said lubricant chamber with lubricant.

5. In a percussion tool having housing means, a chamber in said housing means containing lubricant and having a pair of axial walls, a shaft extending through said chamber and adapted to be rotated, guide elements diametrically disposed on said housing means, eccentric weight means secured to said shaft and rotatable therewith to effect reciprocation of said housing means in response to rotation of said shaft and frame means having means thereon adapted to receive said guide elements to support said housing means for reciprocating movement perpendicular to the axis of rotation of said shaft, a lubrication device which comprises:

means defining a pair of bearing chambers in said housing means disposed on opposite sides of the lubricant-containing chamber and communicating therewith;

bearing means in said bearing chambers supporting said shaft for rotation;

annular flange means secured to said shaft within said lubricant-containing chamber, said flange means having a pair of axial surfaces, each surface being adjacent an axial wall and defining passageway means therebetween;

whereby the lubricant within the lubricant chamber is caused to move erratically and radially of said lubricant chamber and thereby through said passageway means into said bearing means, when said shaft is rotated relative to said housing means.

6. A lubrication device according to claim 5 wherein said annular flange means has arcuate peripheral surfaces covering radially outwardly; and wherein said axial walls of said lubricant chamber are adjacent said arcuate surfaces of said annular flange means to define said passageway means.